T. B. COOK AND L. FOSTER.
RESILIENT BASE.
APPLICATION FILED JULY 28, 1919.

1,338,555.

Patented Apr. 27, 1920.

INVENTORS
TRUMAN B. COOK
LLOYD FOSTER
BY
Shigley & Harney
ATTORNEYS

UNITED STATES PATENT OFFICE.

TRUMAN B. COOK AND LLOYD FOSTER, OF ASTORIA, OREGON.

RESILIENT BASE.

1,338,555.  Specification of Letters Patent.  Patented Apr. 27, 1920.

Application filed July 28, 1919. Serial No. 313,865.

*To all whom it may concern:*

Be it known that we, TRUMAN B. COOK and LLOYD FOSTER, citizens of the United States of America, residing at Astoria, in the county of Clatsop and State of Oregon, have invented certain new and useful Improvements in Resilient Bases, of which the following is a specification.

Our present invention relates to an improved resilient base adapted for supporting operating parts of machinery and in this instance especially designed for use as a support for an electric generator which receives its power from the fly wheel of a motor by frictional contact.

In devices of this character the generator is operated through its pulley by frictional contact from the fly wheel of the motor and the generator is bodily moved toward or away from the fly wheel to couple the generator, or to disconnect it, as required. Resilient means are employed for holding the generator, through its friction pulley, in operative relation to the fly wheel of the motor for the purpose of absorbing shocks and vibrations, due to irregularities in the motor or irregularities in the periphery of its fly wheel, or to inaccurate bearings for the wheel, and this relationship that is maintained by the resilient parts enhances the durability of the generator as well as enables the generator to deliver its accustomed steady flow of current.

The invention consists essentially in certain novel combinations and arrangements of parts as will be hereinafter described and claimed.

In the accompanying drawings one complete example of the physical embodiment of our invention is illustrated, the parts being combined and arranged according to the best mode we have so far devised for the practical application of the principles of our invention.

Figure 1:
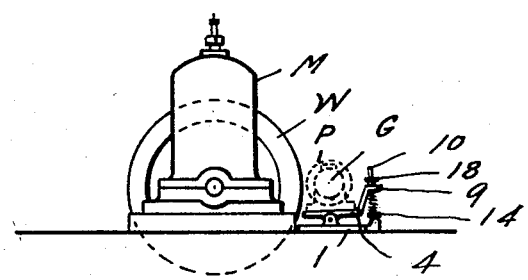
Figure 1 is a view in side elevation showing a gasolene motor, with a generator in dotted lines, and the resilient base of our invention supporting the generator in operative relationship to the motor.

In order that the invention may readily be understood we have illustrated in Fig. 1 its applicability to the gasolene engine or motor M and shown in conventional form the fly wheel W of the motor, and the generator G, and its pulley P adapted to be moved into contact with the wheel W to drive the generator, and to be disconnected therefrom when the generator is not to be used.

The generator is oscillatably supported, or rather is supported upon an oscillatable base or foundation through the fixed base plate 1 of the proper size and shape and secured to a proper foundation by the bolts 2 passing through the several notches 2', as usual. The fixed plate has a pair of upright, perforated ears 3, spaced apart and projecting above its upper surface upon which the oscillatable or tiltable base plate 4 has bearings through its perforated bearing-flanges 5, and the rock shaft or trunnion 6 which is provided with cotter pins 7 as usual.

At its forward end the adjustable plate or base is provided with an upwardly inclined bracket 8 fashioned with a perforated horizontal bearing arm 9 in which the screw bear 10 is operatively maintained, and at its lower end the bar is bent to form the bearing or journal 11 which is rotatable in the perforated, vertically arranged lug 12 projecting at the front of the fixed plate 1.

The adjustable plate or support is supported on this screw bar, and resiliency for the support is attained by the utilization of the coiled spring 13 about the screw bar and interposed between the lower adjusting nut 14 and the loose washer 15 on the screw bar, the washer having an annular flange 16 for the spring and fashioned with a crown or upper sleeve 17 fitting loosely in the perforated bracket arm 9 of the adjustable base plate. The relationship between the bracket and screw bar is fixed by the nut 18, and a spring 19 is provided in connection with this nut to act as a friction device between the bracket arm and the nut, and also to prevent rattling of the parts.

Figures 2, 3:
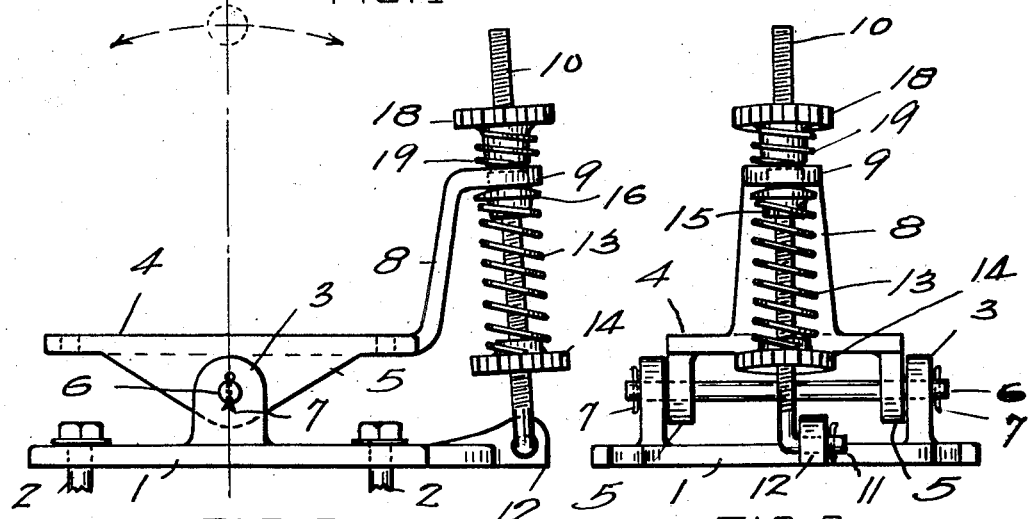
Fig. 2 is an enlarged, side view of the generator base forming the subject matter of the invention.
Fig. 3 is a front end view of the device as seen in Fig. 2.
Figures 4, 5:
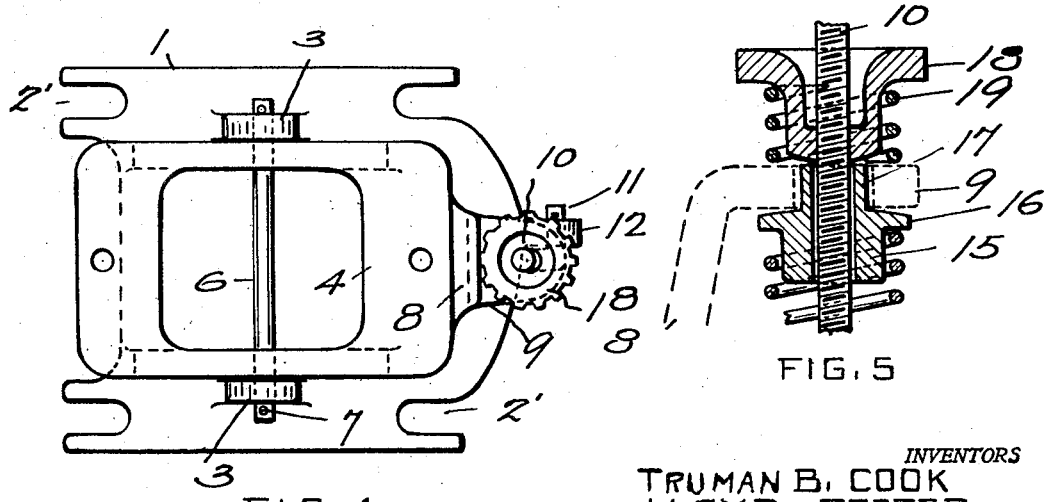
Fig. 4 is a top plan view of the base.
Fig. 5 is an enlarged, sectional detail view of the screw bar and operating nut for adjusting the resiliency of the support and also for connecting or disconnecting the friction members of the motor and generator.

The arrows in Fig. 2 indicate the adjustability of the oscillatable base plate, and it will readily be apparent that turning the nut to the right will depress the bracket arm against the tension of the spring 13 and by this means the pulley P may be withdrawn from frictional contact with the wheel W to disconnect and stop the generator. By turning the nut 18 to the left the spring 13 will urge the adjustable base plate to swing to the left in Fig. 2 on its axis or trunnion 6, and thus the pulley may be moved by the action of the spring 13 into frictional contact with the fly wheel. While the frictional contact is maintained by the spring, it will be evident that the flexibility of the resiliently supported bracket arm 9 will allow for movement of the base 4 due to irregularities in either the bearings of the motor or generator, or in the frictional contact of the wheel and pulley, and these irregularities, shocks, and vibrations are absorbed in manner well understood. As here illustrated the invention is peculiarly well adapted for use in connection with boats where the generator is used in the lighting system, and in installing and assembling the parts, the simplicity of construction permits facile and quick work. After the parts have been properly installed and alined the tension nut 14 is turned to proper position to secure the necessary friction between the fly wheel and pulley, and then the release nut 18 at the top of the screw bar, which it will be noted bears directly upon the loose washer 15 and not on the bracket arm, may be given one or two turns to permit the spring 13 to throw the generator over on its hinge and cause the required frictional contact for the full capacity of the generator.

What we claim is—

1. The combination of a fixed base, a supporting plate hinged on the base to swing with respect thereto and having an outstanding apertured arm, an upstanding screw bar extending loosely through the arm aperture and hinged at its lower end to the base to swing in the direction of swinging movement of the supporting plate, a resilient support for the arm adjustably mounted on the said bar beneath the arm, and a releasing member threaded on the bar above the arm.

2. The combination of a fixed base, a supporting plate hinged on the base to swing with respect thereto and having an outstanding apertured arm, an upstanding screw bar extending loosely through the arm aperture and hinged at its lower end to the base to swing in the direction of swinging movement of the supporting plate, a resilient support for the plate and arm including a spring coiled around the screw bar below the arm, and a nut threaded on the bar and forming an adjustable support for said spring.

3. The combination of a fixed base having an apertured end lug and upstanding side ears, a supporting plate hinged in the said ears, and having an outstanding apertured arm above the lug, a screw bar loosely extending through the arm aperture and having a lower, angular end journaled in the said lug to permit the bar to swing in line with the said plate, and a resilient support for the arm and plate adjustable on the bar below the arm.

4. The combination of a fixed base, a supporting plate hinged on the base to swing vertically with respect thereto, and having an outstanding arm, a screw bar hinged at its lower end to the base and with which the arm is slidably engaged, a spring coiled around the bar below the arm, a nut threaded on the bar and forming an adjustable support for said spring, and a releasing nut threaded on the bar above the arm and having a spring engaging the arm, as described.

In testimony whereof we affix our signatures.

TRUMAN B. COOK.
LLOYD FOSTER.